(12) United States Patent
Pro

(10) Patent No.: US 7,782,572 B2
(45) Date of Patent: Aug. 24, 2010

(54) DISK DRIVE HEAD SUSPENSION FLEXURES HAVING ALTERNATING WIDTH STACKED LEADS

(75) Inventor: John D. Pro, Prior Lake, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 607 days.

(21) Appl. No.: 11/744,644

(22) Filed: May 4, 2007

(65) Prior Publication Data

US 2008/0273269 A1 Nov. 6, 2008

(51) Int. Cl.
*G11B 5/55* (2006.01)
*G11B 21/10* (2006.01)

(52) U.S. Cl. ............. 360/245.9; 360/264.2; 360/246

(58) Field of Classification Search ............. 360/244.1, 360/264.2, 245.3, 245.8, 245.9, 246
See application file for complete search history.

(56) References Cited

U.S. PATENT DOCUMENTS

| | | | |
|---|---|---|---|
| 5,598,307 A | 1/1997 | Bennin | |
| 5,608,591 A | 3/1997 | Klaassen | |
| 5,631,786 A | 5/1997 | Erpelding | |
| 5,694,270 A * | 12/1997 | Sone et al. | 360/245.9 |
| 5,717,547 A | 2/1998 | Young | |
| 5,737,152 A | 4/1998 | Balakrishnan | |
| 5,805,382 A * | 9/1998 | Lee et al. | 360/244.1 |
| 5,986,853 A * | 11/1999 | Simmons et al. | 360/245.9 |
| 5,995,328 A | 11/1999 | Balakrishnan | |
| 6,038,102 A | 3/2000 | Balakrishnan et al. | |
| 6,146,813 A * | 11/2000 | Girard et al. | 430/319 |
| 6,275,358 B1 | 8/2001 | Balakrishnan et al. | |
| 6,300,846 B1 * | 10/2001 | Brunker | 333/1 |
| 6,404,594 B1 * | 6/2002 | Maruyama et al. | 360/245.8 |
| 6,493,190 B1 * | 12/2002 | Coon | 360/245.9 |
| 6,798,597 B1 | 9/2004 | Aram et al. | |
| 6,801,402 B1 * | 10/2004 | Subrahmanyam et al. | 360/245.9 |
| 6,839,204 B2 | 1/2005 | Shiraishi et al. | |
| 6,900,967 B1 * | 5/2005 | Coon et al. | 360/245.9 |
| 6,963,471 B2 * | 11/2005 | Arai et al. | 360/246 |
| 6,975,488 B1 | 12/2005 | Kulangara et al. | |
| 7,092,215 B2 | 8/2006 | Someya et al. | |
| 7,382,582 B1 * | 6/2008 | Cuevas | 360/245.9 |
| 7,701,674 B2 * | 4/2010 | Arai | 360/245.9 |
| 2007/0133128 A1 | 6/2007 | Arai | |

FOREIGN PATENT DOCUMENTS

EP 0834867 5/2007

\* cited by examiner

*Primary Examiner*—Julie Anne Watko
(74) *Attorney, Agent, or Firm*—Faegre & Benson LLP

(57) ABSTRACT

An integrated lead flexure for a disk drive head suspension of the type having a plurality of stacked leads disposed on separate layers, the plurality of stacked leads extending between terminal connector pads and head connector pads, comprising stacked lead pairs having opposing and regularly alternating wider and narrower portions, respectively.

10 Claims, 6 Drawing Sheets

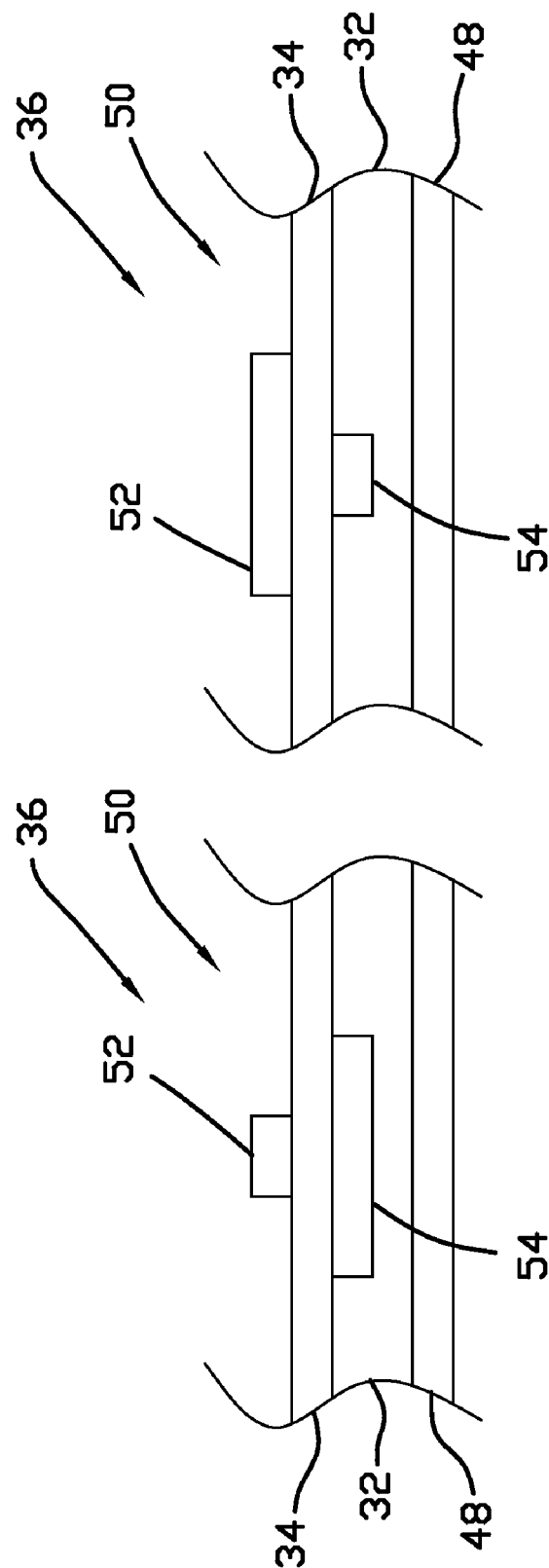

DISK DRIVE HEAD SUSPENSION FLEXURES HAVING ALTERNATING WIDTH STACKED LEADS

TECHNICAL FIELD

The present invention relates generally to disk drive head suspensions. In particular, the invention is an integrated lead flexure for a suspension.

BACKGROUND

Disk drive head suspensions with wireless or integrated lead flexures are generally known and disclosed, for example, in the following U.S. Patents, all of which are incorporated herein by reference.

| Inventor Name | Patent No. |
| --- | --- |
| Bennin | 5,598,307 |
| Klaassen | 5,608,591 |
| Erpelding | 5,631,786 |
| Young | 5,717,547 |
| Balakrishnan | 5,737,152 |
| Balakrishnan | 5,995,328 |
| Balakrishnan et al. | 6,038,102 |
| Balakrishnan et al. | 6,275,358 |
| Shiraishi et al. | 6,839,204 |
| Kulangara et al. | 6,975,488 |

The continuing development of read/write head and related disk drive technology requires flexures having improved mechanical and electrical specifications. For example, impedance variations along transmission pathways reduce flexure electrical performance. Some impedance variation may result from variations in trace-to-trace alignment in stacked trace configurations, also referred to as a broadside coupled traces. Trace-to-trace alignment variations can be introduced during manufacture, for example due to process variations. There remains, therefore, a continuing need for integrated lead flexures having improved impedance characteristics.

SUMMARY

The present invention is an improved integrated lead flexure having alternating width stacked traces. One embodiment is an integrated lead flexure for a disk drive head suspension of the type having a plurality of stacked leads disposed on separate layers. The plurality of stacked leads extend between terminal connector pads and head connector pads. The stacked leads have opposing and regularly alternating wider and narrower portions, respectively.

BRIEF DESCRIPTION OF THE DRAWINGS

FIGS. 2A and 2B are schematic views of a cross-section of a stacked pair of traces.

DETAILED DESCRIPTION

Figure 1:
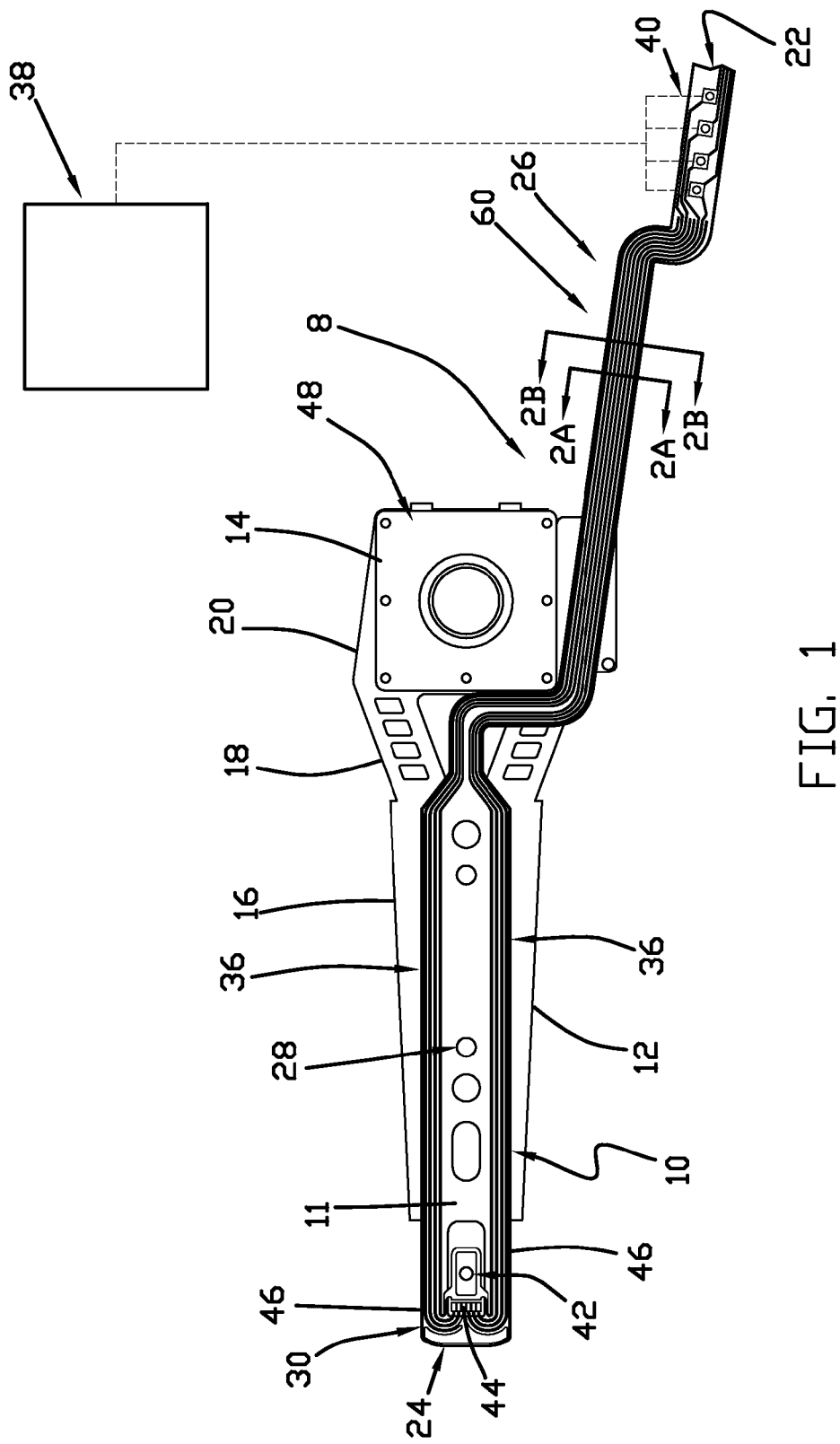
FIG. 1 is an illustration of a disk drive head suspension having a flexure in accordance with the present invention.

FIG. 1 shows a disk drive head suspension 8 including an integrated flexure 10 in accordance with one embodiment of the present invention. Suspension 8 is a three-piece assembly in the illustrated embodiment, and includes a load beam 12 and base plate 14 in addition to the flexure 10, although other configurations are also contemplated. Load beam 12, which is typically formed from stainless steel, includes a beam region 16, a hinge region 18 and a mounting region 20. The base plate 14 is welded to the mounting region 20 at the proximal end of the load beam 12.

The flexure 10 is an integrated lead, or wireless, flexure and extends from a proximal end 22 to a distal end 24. The illustrated embodiment of the flexure 10 has a tail region 26 extending from the proximal end 22, a mounting or base region 28 that is welded or otherwise attached to the beam region 16 of load beam 12, and a gimbal region 30 extending distally from the base region 28. The flexure 10 includes first and second insulating layers 32, 34 (FIGS. 2A and 2B) of dielectric material and one or more integrated transmission line array(s) 36 supported and electrically insulated by the insulating layers 32, 34. At least a portion of the integrated transmission line array(s) 36 has a stacked configuration, including a plurality of traces that are stacked, one on top of the other. The traces of the integrated transmission line array(s) 36 can be formed by known additive and/or subtractive processes.

The proximal end of the tail region 26 includes a plurality of terminal connector pads 40 adapted for connection to electronics in the disk drive in which the suspension 8 is incorporated. For purposes of illustration, the connector pads 40 are shown connected to a preamp/driver circuit 38, as shown generally in FIG. 1.

The gimbal region 30 includes a slider mounting region 42 for mounting a head slider having a transducer head. The slider mounting region 42 includes a plurality of head connector pads 44. In general terms, the plurality of head connector pads 44 are bond pads for providing an electrical connection to the transducer head.

Base region 28 and portions of the gimbal region 30 are formed from a spring metal base layer 48. Stainless steel is commonly used for the spring metal base layer 48 in applications of this type. Portions of the electrical structures, including the connector pads 40, 44 and the integrated transmission line array(s) 36 that overlay the spring metal base layer 48 are spaced and electrically insulated from the spring metal base layer 48 by the first and second insulating layers 32, 34. For reference, polyimide is one acceptable dielectric material for providing electrical insulation in applications of this type.

The plurality of head connector pads 44 can be flying pads that extend over a window in the spring metal layer 48. In other embodiments of the invention, some or all of the connector pads 40, 44 and portions or all of the integrated transmission line array(s) 36 can be backed by or overlay the spring metal base layer 48 (e.g., one or more traces, or leads, making up the integrated transmission line array(s) 36 can extend over a pair of spring arms 46 in the gimbal region 30). The integrated transmission line array(s) 36 extend through one or more transmission pathways from the terminal connector pads 40 to the head connector pads 44.

FIGS. 2A and 2B are schematic, cross-sectional views of the flexure 10 at a portion 60 of the transmission line array(s) 36 where stacked traces of the integrated transmission line array(s) 36 vary in width in an alternating manner. This relationship can be described with reference to a first trace 52 and a second trace 54 of the integrated transmission line array(s) 36, where at least a portion of the first and second traces 52, 54 are stacked, one over the other, the two traces 52, 54 having alternating wider and narrow portions.

FIG. 2A shows a cross-section of the alternating portion 60 at a position where the first trace 52 is narrower than the second trace 54 while FIG. 2B shows a cross-section of the alternating portion 60 at a position where the second trace 54 is narrower than the first trace 52. The alternating portion 60 is indicated at the tail region 26 in FIG. 1, although the transmission line array(s) 36 can have alternating widths along any or all of the tail, base, and gimbal regions 26, 28, 30. For example, in one embodiment, the alternating portion 60 is located on all of the tail, base, and gimbal regions 26, 28, 30 with the first and second traces 52, 54 regularly, or periodically, alternating in width along most or substantially all of their lengths from proximate the terminal connector pads 40 to proximate the head connector pads 44. As another non-limiting example, the alternating portion 60 is located in the tail and gimbal regions 26, 30, but not the base region 28, in another embodiment.

The first trace 52 and the second trace 54 are a read or write pair of stacked traces, with the first and second traces 52, 54 defining opposite polarity transmission pathways, stacked one over the other, and extending between one or more head and terminal connector pads 40, 44. Where the first and second traces 52, 54 are stacked, the first and second traces 52, 54 extend along different planes, or layers. The first trace 52 extends over at least a portion of the spring metal base layer 48. The second trace 54 also extends over at least a portion of the base layer 48. The first insulating layer 32 extends between the base layer 48 and the first trace 52. In turn, the second insulating layer 34 extends between the first and second traces 52, 54, electrically insulating each from the other. As previously referenced, the transmission line array(s) 36 is optionally a stacked trace array including a plurality of stacked trace pairs similar to the first and second traces 52, 54.

Figure 3A:
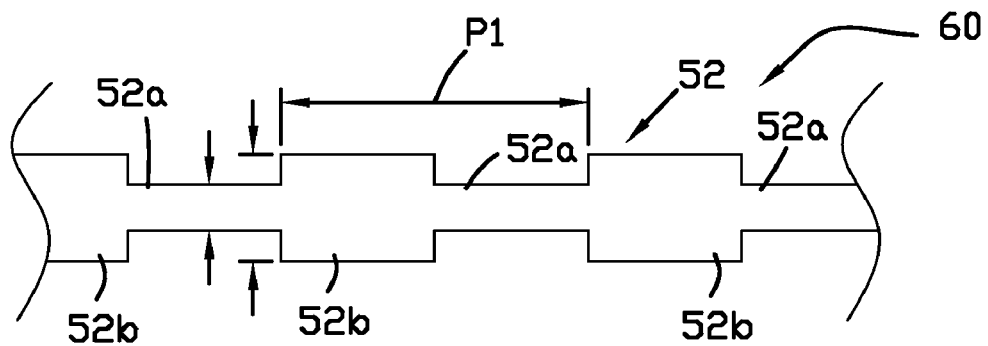
FIGS. 3A-3C, 4A-4C, 5A-5C, and 6A-6C are schematic views illustrating various stacked trace configurations having alternating widths in accordance with the present invention.
Figure 3B:
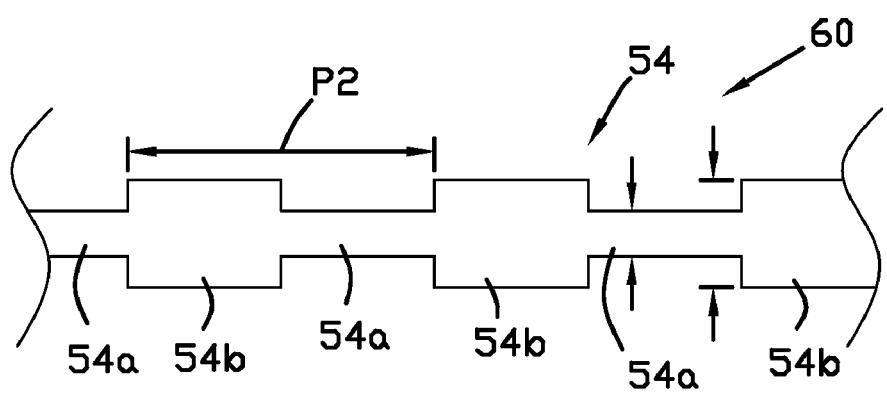
Figure 3C:
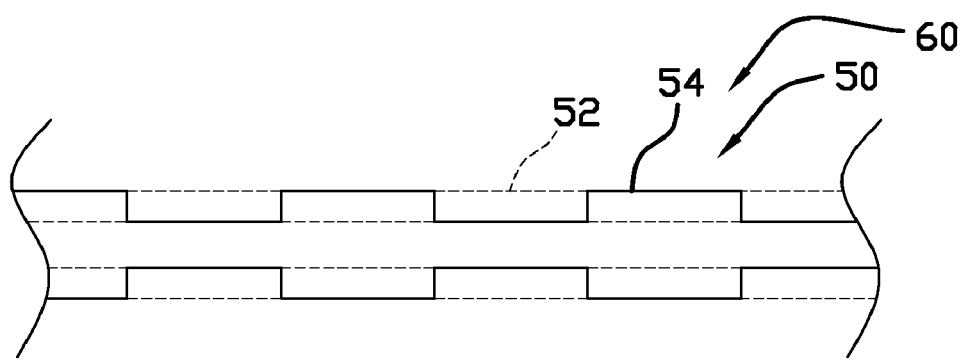

FIGS. 3A-3C are schematic, top views of the first and second traces 52, 54 showing footprints defined by each of the first and second traces 52, 54. FIG. 3A illustrates a portion of the first trace 52 and FIG. 3B illustrates a corresponding portion of the second trace 54. As the first and second traces 52, 54 extend through the alternating portion 60, the first trace 52 has a series of regularly repeating narrow segments 52a and wide segments 52b and the second trace 54 similarly has a series of regularly repeating narrow segments 54a and wide segments 54b. The narrow segments 52a of the first trace 52 are opposed to the wide segments 54b of the second trace 54, while the wide segments 52b of the first trace 52 are opposed to the narrow segments 54a of the second trace 54.

In one embodiment, the footprint defined by the first trace (FIG. 3A) and the footprint defined by the second trace (FIG. 3B) are substantially the same, but offset in phase. As used herein, "footprint" generally refers to a profile of a particular trace as taken in the layer or plane of transmission through which the trace extends. The first and second traces 52, 54 vary in width along their respective lengths with the same periodicity in one embodiment. In particular, the first trace 52 varies in width at a first period $P_1$ and the second trace 54 varies in width at a second period $P_2$ substantially the same as the first period $P_1$. The first and second periods $P_1$, $P_2$ are each optionally about 1 mm or less in one embodiment. In another embodiment, the first and second periods $P_1$, $P_2$ are selected according to a minimum or average transmission signal wavelength ($\lambda$) transmitted through the first and second traces 52, 54. For example, the first and second periods $P_1$, $P_2$ are each $\lambda/20$ or less in one embodiment.

As previously referenced, the varying portions of the first and second traces 52, 54 are out of phase with one another by about 180 degrees. In other words, the first and second traces 52, 54 regularly alternate in width with respect to one another.

In one embodiment, the widths of the first and second traces 52, 54 vary with substantially the same amplitude. Furthermore, each of the traces 52, 54 has substantially the same average width, where the average of the widths of the narrow and wide segments 52a, 52b and the average of the widths of the narrow and wide segments 54a, 54b are about the same.

FIG. 3C is a schematic, top view of the first and second traces 52, 54 showing their relative positions as they extend through the alternating portion 60, where the first trace 52 is shown in solid lines and the second trace 54 is shown in dotted lines. As shown in FIG. 3C, the first and second traces 52, 54 are laterally aligned, stacked top-to-bottom, one over the other along their lengths, with the second insulating layer 34 separating the first and second traces 52, 54.

The alternating patterns of narrow and wide segments 52a, 54a, 52b, 54b of each of the first and second traces 52, 54 each vary according to a square waveform. In one embodiment, there is little or substantially no top-to-bottom overlap of the relatively narrower portions 52a, 54a, nor is there overlap of the wider portions 52b, 54b. As will be described in greater detail below with reference to FIGS. 4C, 5C, and 6C, some other embodiments include overlapping transitions between the narrow and wider trace segments 52a, 54a, 52b, 54b.

The alternating width patterns described in association with the first stacked pair of traces 50 help provide a more desirable characteristic impedance for the integrated transmission line array(s) 36 of the flexure 10. For example, the characteristic impedance of stacked traces is affected by top-to-bottom trace registration. Some amount of misregistration is often induced by variability in associated manufacturing processes (e.g., photolithographic processes), which, in turn, increases variability in characteristic impedance of the integrated transmission line array(s) 36. As traces, or leads, become narrower and narrower, the potential for misregistration increases which translates to increased variability in characteristic impedance.

Regardless of the particular source of misregistration, one means of reducing sensitivity to misregistration is to make one trace of a stacked pair wider than the other in order to help ensure a minimal amount of top-to-bottom overlap. By further incorporating regularly alternating widths between the stacked pair of traces, a more constant phase and group delay is maintained along the transmission pathway than would otherwise be accomplished by simply having one wide trace and one narrow trace. For example, the average width of the first and second traces 52, 54 is substantially the same and the first and second traces have substantially the same footprint as they extend through the alternating portion 60, which helps promote such beneficial phase and group delay characteristics, among other beneficial characteristics.

Figure 4A:
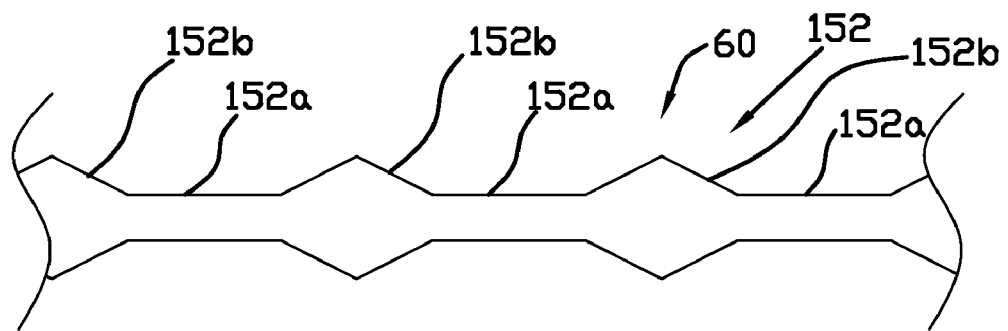
Figure 4B:
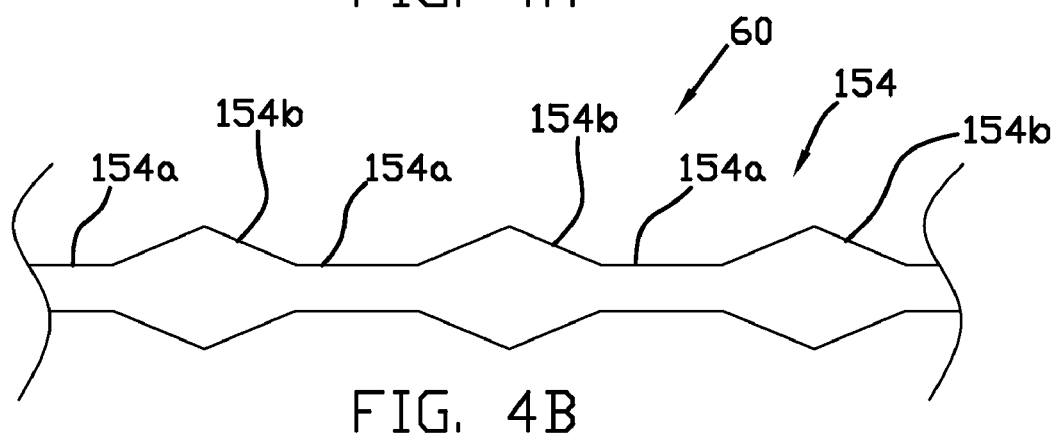
Figure 4C:
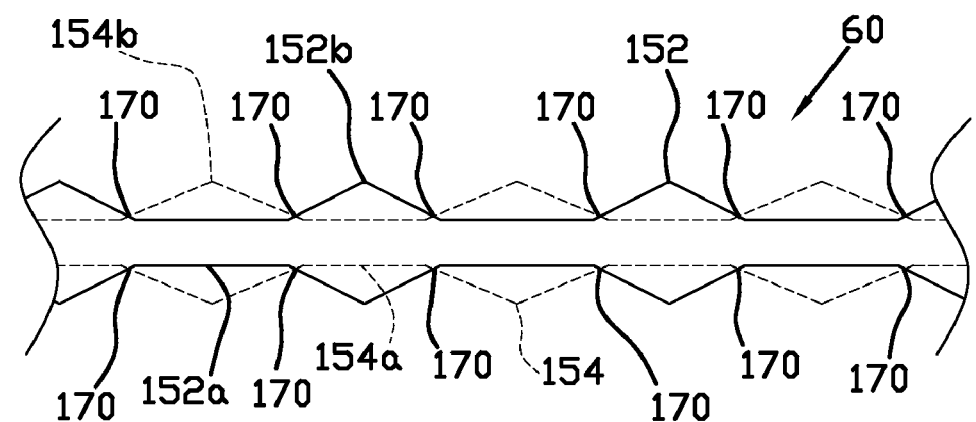

Although the first pair of stacked traces 50 has been described as having footprints that transition between wide and narrow segments according to a square waveform pattern, other embodiments include a variety of different footprint/transition patterns. For example, FIGS. 4A-4C show another embodiment pair of stacked traces 150 that are optionally provided in association with the alternating portion 60 (FIG. 1). The pair of stacked traces 150 vary in width according to a different pattern than the stacked traces 50. The pair of stacked traces 150 each have the same footprints and are otherwise generally similar to the first pair of stacked traces 50 according to one embodiment. The pair of stacked traces 150 includes a first trace 152 and a second trace 154, where the first and second traces 152, 154 have a series of alternating narrow segments 152a, 154a and wide segments 152b, 154b. The first and second traces 152, 154 each have a regularly varying pattern in width. The regularly varying patterns in width have substantially the same period and are offset in phase by about 180 degrees. The wide segments 152b, 154b are scalloped, or are otherwise tapered in width, which helps reduce signal reflection and unwanted impedance variation due to rapid geometry changes in some embodiments. As shown in FIG. 4C, the narrow and wide segments 152a, 154a, 152b, 154b have a plurality of overlapping transition areas 170 where the first and second traces 152, 154 transition between the narrow and wider segments 152a, 154a, 152b, 154b.

Figure 5A:
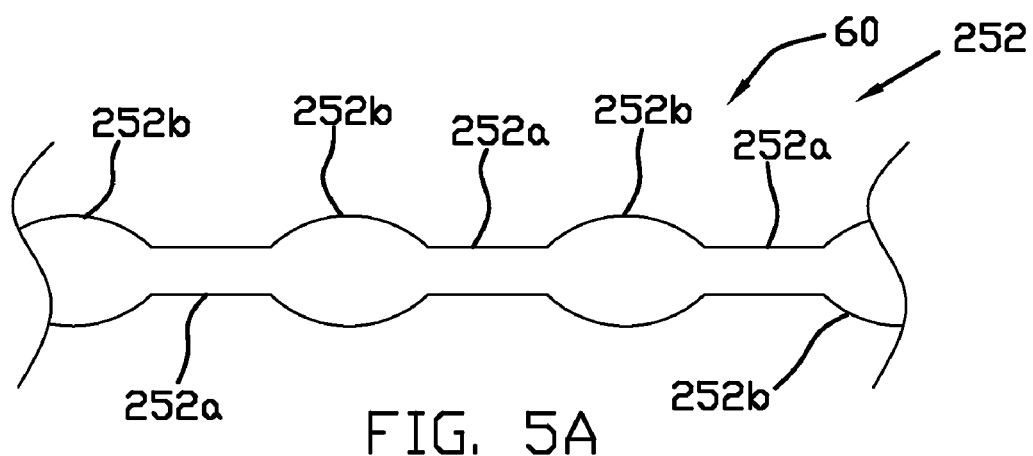
Figure 5B:
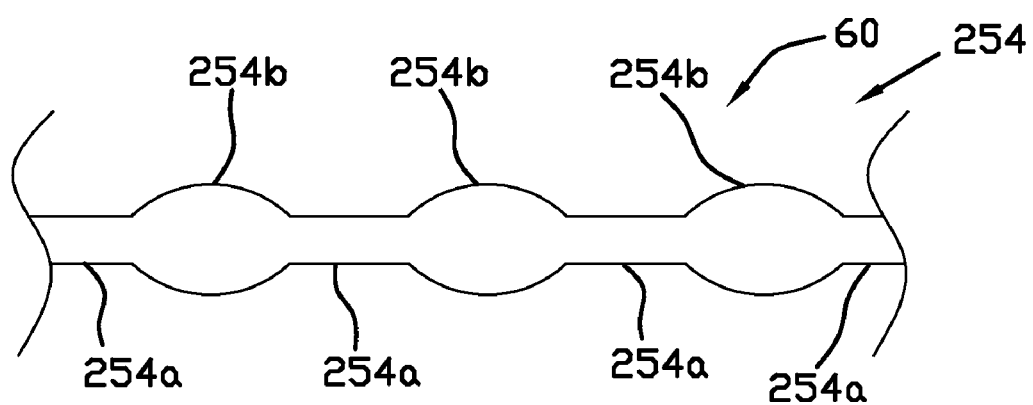
Figure 5C:
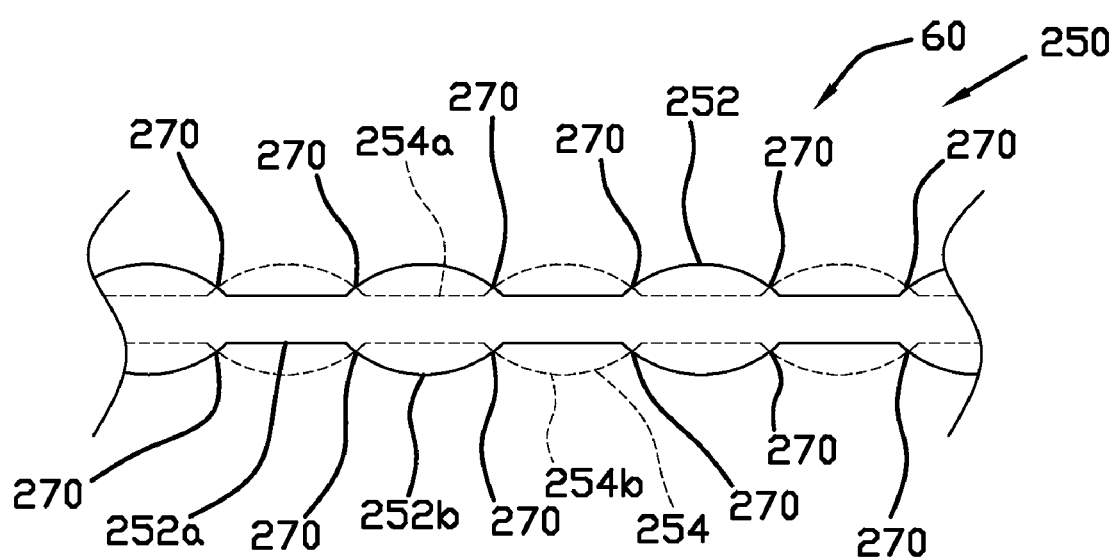

FIGS. 5A-5C show yet another embodiment pair of stacked traces 250 associated with the alternating portion 60 (FIG. 1). The pair of stacked traces 250 vary in width according to a different pattern than the first pair of stacked traces 50 and the pair of stacked traces 150. The pair of stacked traces 250 each have same footprint and are otherwise generally similar to the first pair of stacked traces 50 according to one embodiment. The first and second traces 252, 254 each have a regularly varying pattern in width. The regularly varying patterns in width have substantially the same period and are offset in phase by about 180 degrees. The pair of stacked traces 250 includes a first trace 252 and a second trace 254, where the first and second traces 252, 254 have an alternating series of narrow segments 252a, 254a and wide segments 252b, 254b. The wide segments 252b, 254b are arcuate, or are otherwise rounded off in width, which helps reduce signal reflection and unwanted impedance variation due to rapid geometry changes in some embodiments. As shown in FIG. 5C, the narrow and wide segments 252a, 254a, 252b, 254b have a plurality of overlapping transition areas 270 where the first and second traces 252, 254 transition between the narrow and wider segments 252a, 254a, 252b, 254b.

Figure 6A:
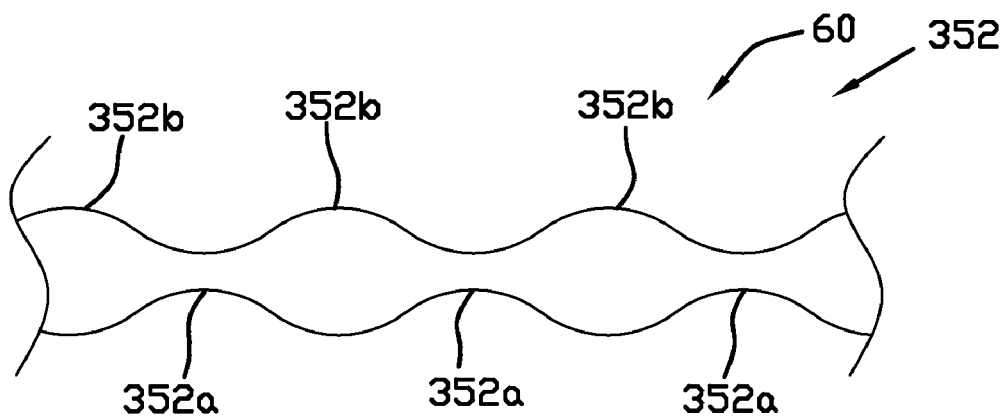
Figure 6B:
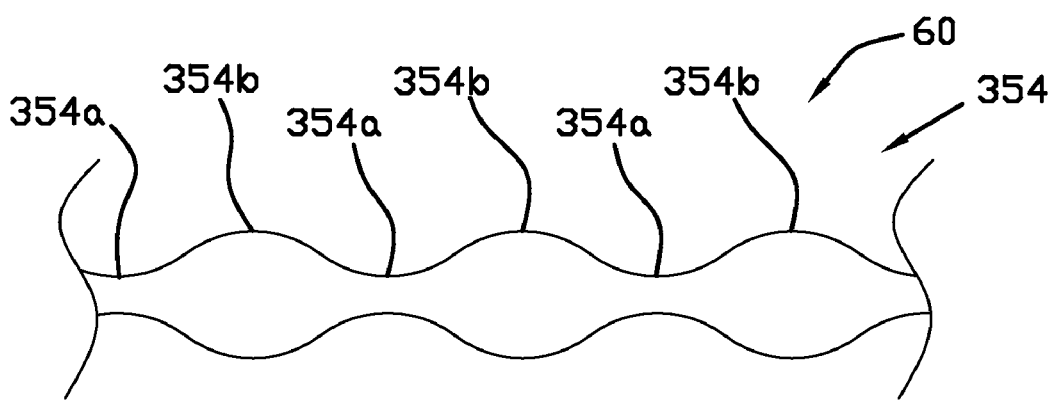
Figure 6C:
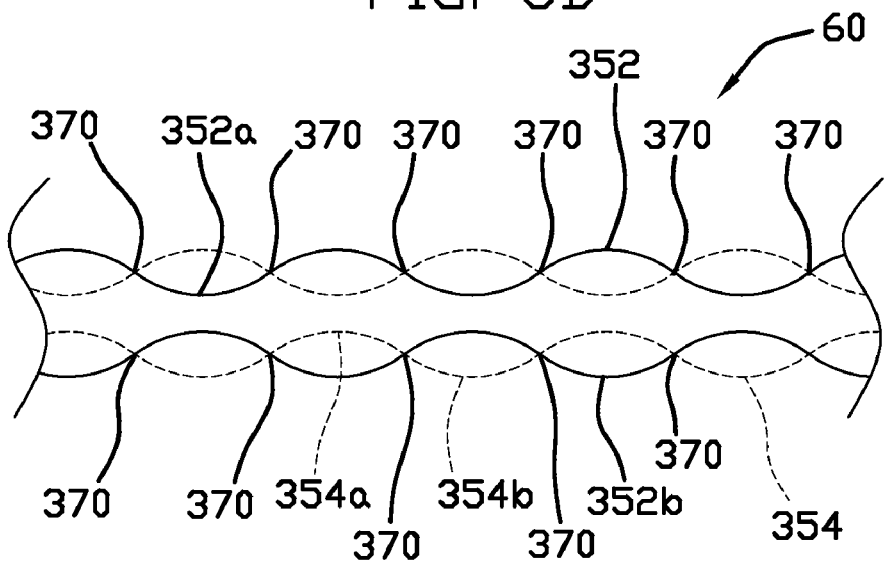

FIGS. 6A-6C show still another embodiment pair of stacked traces 350 extending through the alternating portion 60 (FIG. 1). The pair of stacked traces 350 vary in width according to a different pattern than the first pair of stacked traces 50. The pair of stacked traces 350 each have the same footprint and are otherwise generally similar to the first pair of stacked traces 50 according to one embodiment. The pair of stacked traces 350 includes a first trace 352 and a second trace 354. The first and second traces 352, 354 each have a regularly varying pattern in width, where the first and second traces 352, 354 each have an alternating series of narrow segments 352a, 354a and wide segments 352b, 354b. The narrow and wide segments 352a, 352b of the first trace 352 smoothly transition between one another according to a sinusoidal waveform, which helps reduce signal reflection and unwanted impedance variation due to rapid geometry changes in some embodiments. The narrow and wide segments 354a, 354b of the second trace 354 similarly transition according to a sinusoidal waveform. The regularly varying patterns in width have substantially the same period and are offset in phase by about 180 degrees. As shown in FIG. 6C, the narrow and wide segments 352a, 354a, 352b, 354b have a plurality of overlapping transition areas 370 where the first and second traces 352, 354 transition between the narrow and wider segments 352a, 354a, 352b, 354b.

The foregoing description is to be read as a whole, with features and principles described in association with the various embodiments being taken cumulatively in nature. Although the present invention has been described with reference to preferred embodiments, those skilled in the art will recognize that changes can be made in form and detail without departing from the spirit and scope of the invention.

What is claimed is:

1. An integrated lead flexure for a disk drive head suspension, the integrated lead flexure comprising:
    a spring metal base layer;
    a first trace extending over at least a portion of the base layer, at least a portion of the first trace having a periodically varying width;
    a second trace overlaying the first trace, at least a portion of the second trace having a periodically varying width that is opposed to, of substantially the same period as, and substantially out of phase with the periodically varying width of the first trace;
    a first insulating layer between the base layer and at least a portion of the first trace; and
    a second insulating layer between at least portions of the first and second traces.

2. The integrated lead flexure of claim 1, wherein the periodically varying widths of the first and second traces are out of phase by about 180 degrees.

3. The integrated lead flexure of claim 1, wherein the traces vary in width according to a square waveform function.

4. The integrated lead flexure of claim 1, wherein the integrated lead flexure includes a plurality of head connector pads and a plurality of terminal connector pads between which the first and second traces extend, and further wherein the first and second traces periodically vary in width from proximate the head connector pads to proximate the terminal connector pads.

5. The integrated lead flexure of claim 1, wherein the traces vary in width with a period of about 1 mm or less.

6. The integrated lead flexure of claim 1, wherein the varying portions of the first and second traces have substantially the same average width.

7. The integrated lead flexure of claim 1, wherein the varying portions of the first and second traces have substantially the same footprint.

8. An integrated lead flexure for a disk drive head suspension, comprising a plurality of layers including a first trace having a first series of regularly alternating wide and narrow segments, a second trace having a second series of regularly alternating wide and narrow segments, and an insulating layer, the first series and the second series having substantially the same period and being stacked one over the other with the insulating layer extending between at least a portion of the first and second series.

9. The integrated lead flexure of claim 8, wherein the first series is out of phase with the second series by about 180 degrees.

10. An integrated lead flexure for a disk drive head suspension of the type having a plurality of stacked leads disposed on separate layers, the plurality of stacked leads extending between terminal connector pads and head connector pads, comprising the stacked leads having opposing and regularly alternating wider and narrower portions having substantially the same period, respectively.

* * * * *